United States Patent [19]
Tiby

[11] 3,857,310
[45] Dec. 31, 1974

[54] FOOD CUTTING AND DICING APPARATUS

[75] Inventor: Gerard A. Tiby, Ivry S/Seine, France

[73] Assignee: Hobart Corporation, Troy, Ohio

[22] Filed: Dec. 18, 1972

[21] Appl. No.: 316,281

[52] U.S. Cl............... 83/26, 83/27, 83/102, 83/404.3, 83/403, 83/356.3, 209/120
[51] Int. Cl............................................. B26d 7/06
[58] Field of Search .......... 83/26, 27, 47, 102, 104, 83/105, 106, 110, 356.1, 356.3, 357, 403, 404.3, 408; 209/115, 120

[56] References Cited
UNITED STATES PATENTS

| | | |
|---|---|---|
| 2,138,262 | 11/1938 | Urschel et al............................ 83/27 |
| 2,436,410 | 2/1948 | Urschel et al......................... 83/404.3 |
| 2,465,670 | 3/1949 | Urschel et al............................ 83/403 |
| 2,482,523 | 9/1949 | Urschel et al......................... 83/356.3 |
| 2,923,337 | 2/1960 | Jouin .................................... 83/403 |
| 3,472,297 | 10/1969 | Urschel et al......................... 83/404.3 |

Primary Examiner—Willie G. Abercrombie
Attorney, Agent, or Firm—Biebel, French & Bugg

[57] ABSTRACT

A foot cutting and dicing apparatus cuts food articles into slices, strips, or cubes by the selective use of a slicing blade, strip blades, and a rotatable cutter member. An adjustable vane separates the food scraps from the properly cut food articles.

14 Claims, 5 Drawing Figures

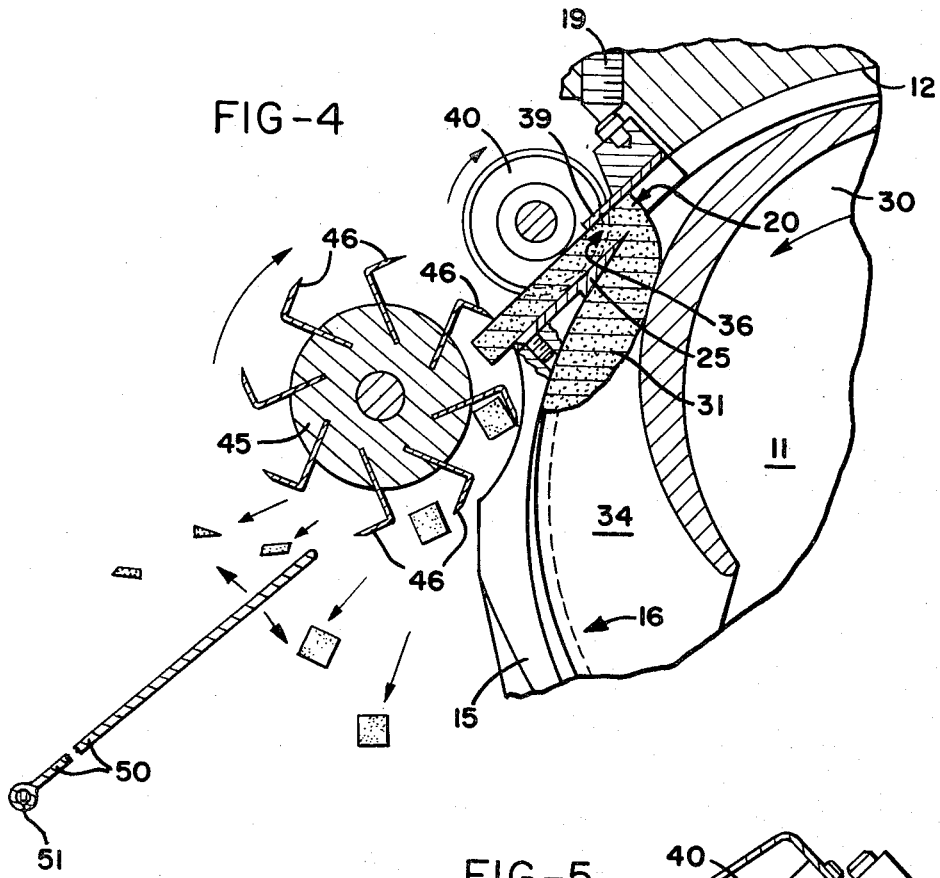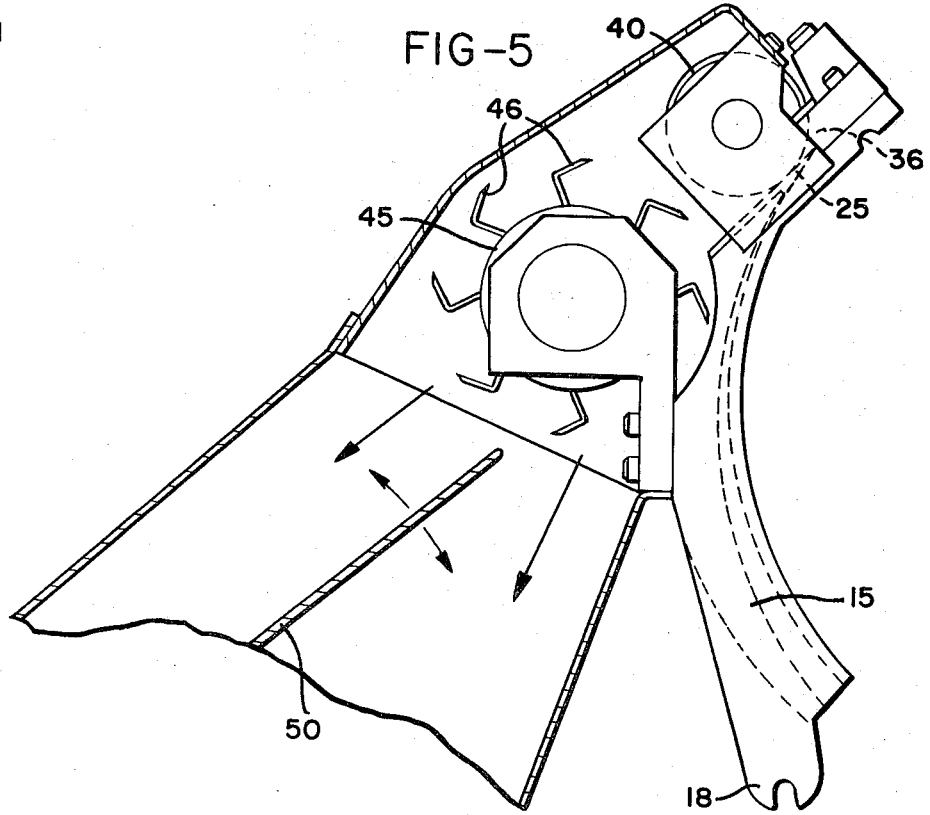

FOOD CUTTING AND DICING APPARATUS

BACKGROUND OF THE INVENTION

This invention relates to apparatus for cutting vegetables and fruits into slices, strips, and/or cubes, and more particularly to improved door, blade and rotatable cutter member structures for a food cutting apparatus such as is disclosed by my U.S. Pat. No. 3,361,171 assigned to the assignee of the present invention. The U.S. Pat. No. 3,361,171 is in turn an improvement over U.S. Pat. No. 2,923,337, and discloses a highly effective food cutting apparatus for cutting food articles into slices, strips and/or cubes.

A variety of different cutting blades could be used with the U.S. Pat. No. 3,361,171, device to produce widely varying types of end products. The cutting cage of the U.S. Pat. No. 3,361,171 invention was used for reducing slices into cubes and was somewhat expensive due to the larger number of interlocking knives required. Further, it depended upon subsequently cut cubes to discharge the previously cut cubes. That is to say, each cube remained in the knife structure of the cage until a subsequent cube pushed the earlier cube into the core of the cage. The cubes within the core were urged out of the apparatus by a guide plate located therein.

When a different type of product was desired, it was commonly necessary to provide an entirely separate door having different blade structures thereon, one for each type of end product desired. Thus a machine able to produce cubes, french fries strips, and/or slices would commonly require a minimum of three door assemblies.

The prior art machines also discharged the irregularly cut food pieces and scraps along with the properly shaped food article cubes, strips, and/or slices. Thus, when separation of the properly shaped pieces from the scraps was desired, a fairly lengthy, large, and sophisticated sorting machine was necessary in addition to the food cutting apparatus itself.

Thus, although the above noted machines were highly effective, a need still exists for an equally effective but less costly apparatus, one which requires less attention in cleaning the last cubes from between the cage knives, and one which effectively separates the properly cut food articles from the food scraps.

SUMMARY OF THE INVENTION

Briefly, a preferred embodiment of the present invention includes a food cutting apparatus having a feed member for receiving the food articles and rotating them around a chamber to press them periodically against a slicer blade adjacent a discharge passage. The articles are first cut into slices by the slicer blade and then into strips by a strip blade means. The strips are then passed to a rotating cutter member which cuts them further into cubes.

The cutter member has a plurality of peripheral knives on the outer circumference thereof. The knives are generally L-shaped in cross section and the cutting edges thereof are spaced apart at distances several times greater than the thicknesses of the food article slices.

The cutter member rotates at a very high velocity and the centrifugal forces developed quickly expel the cut cubes from the peripheral knives.

On the other hand, the irregularly cut food articles and the food scraps are not expelled quite as quickly, and are thus thrown from the cutter member in a slightly different direction. An adjustable separation vane is therefore mounted adjacent the discharge from the rotating cutter member and is positionable between the discharge of the food article cubes and the discharge of the food article scraps to separate the scraps from the cubes in a very easy and highly economical fashion.

Whe strips (as for french fries) are desired, the cage may be simply removed and the discharge from the strip blades then collected. Alternatively, the strip blade means may be removed, and the cutter member used to cut the slices crosswise into french fry strips. When the cutter member is thus used for cutting the slices into strips, the separation vane may also be used, as mentioned above, to separate the strips from the food scraps.

When slices (as for scalloped potatoes) are desired both the cutter member and the strip blades are removed.

Thus, only one set of blades and one cutter member are required, and the apparatus may quickly be converted from one cutting pattern to another with a maximum of convenience. The food articles are positively discharged as they are cut, requiring no subsequent removal and greatly facilitating cleaning and sanitary maintenance of the apparatus. Interlocking cage blades are avoided, resulting in considerable savings. Separation of the properly cut food articles from the food scraps is easily and efficiently effected, resulting in further substantial savings.

It is therefore an object of this invention to provide an improved food cutting and dicing apparatus for cutting food articles into slices, strips, or cubes; an apparatus which is quickly and easily convertible from one type of cutting pattern to another; which automatically and continuously removes the cubed portions of the food articles from a rotatable cutter member having peripheral knives mounted thereon; which will accomplish the above objects without mashing, squeezing, tearing, bruising, or otherwise damaging the food articles during the cutting thereof; which is inexpensive and quickly and easily cleanable; which has a slicer blade means cooperating with a strip blade means to cut the food articles into strips; which rotates the cutter member at a velocity sufficient to expel the cut cubes therefrom by means of centrifugal forces; which includes a separation vane mounted adjacent the discharge of the cut food articles from the rotating cutter member to separate the food scraps from the properly cut food articles; and to provide all the foregoing in a convenient, uncomplicated, inexpensive, durable, and reliable apparatus which will be easy to maintain in a cleam and sanitary condition.

Other objects and advantages of the invention will become apparent from the following detailed description, the accompanying drawings and the appended claims.

BRIEF DESCRIPTION OF THE DRAWINGS

FIG. 4 is a somewhat diagrammatic cross sectional view of the apparatus of FIG. 1 showing the assembled door, slicer blade, strip blades, and rotating cutter member cutting a food article into cubes, and showing the separation vane separating the cubes from the food scraps; and FIG. 5 is a cross sectional view of the FIG. 3 assembly with a housing and with the separation vane mounted thereon.

DESCRIPTION OF THE PREFERRED EMBODIMENT

Figure 1:
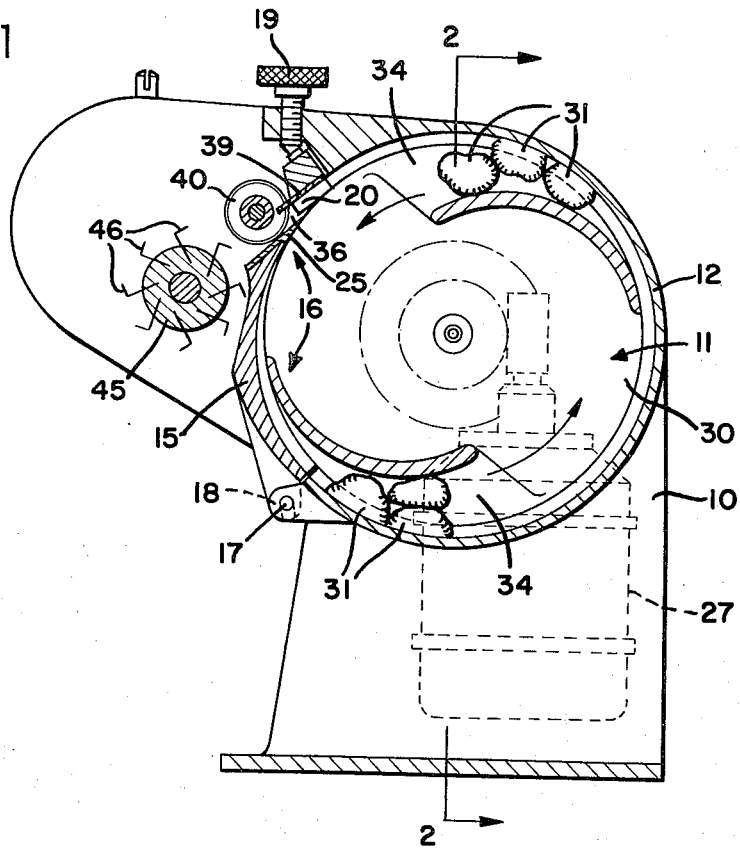
FIG. 1 is a somewhat diagrammatic partial cross sectional view of a food cutting and dicing apparatus according to this invention, taken generally on line 1—1 of FIG. 2.
Figure 2:
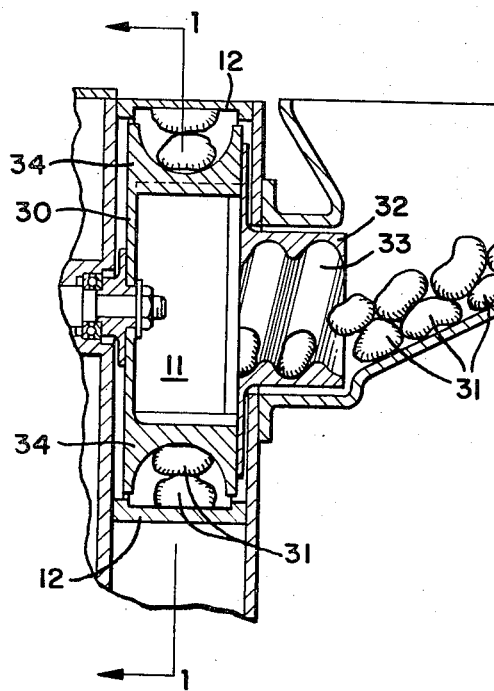
FIG. 2 is a cross sectional view of a portion of a FIG. 1 device taken on line 2—2 of FIG. 1.
Figure 3:
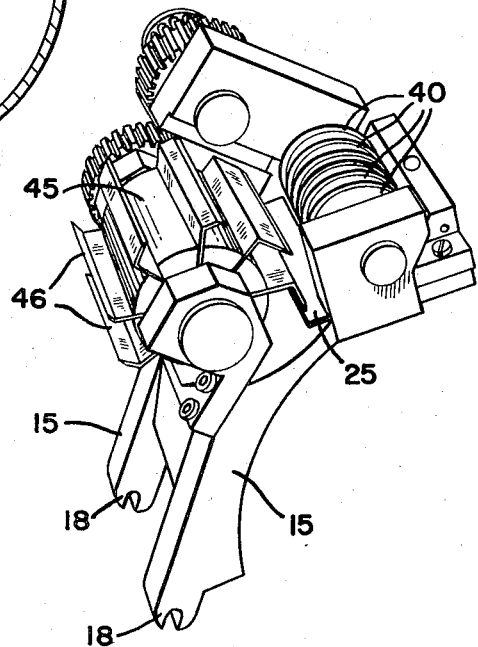
FIG. 3 is a perspective view of the assembled door, slicer blade, strip blades, and rotating cutter member of this invention.

With reference to the drawings, and more particularly to FIG. 1, a preferred embodiment of this invention includes a housing 10 having a chamber 11 on the interior thereof. Chamber 11 is generally cylindrical in shape, and has a smooth cylindrical internal surface or wall means 12. A portion of the internal cylindrical surface 12 is defined by a door member 15 which is attached over a port 16 in the cylindrical surface 12. Door 15 is attached to the housing 10 at one end by means of a pin 17 extending through a pair of ears 18 on the housing 10. The other end of the door 15 is removably retained in position by means of a thumb screw 19. A passageway 20 is provided through door 15, with a slicer blade 25 located adjacent the passage 20. Slicer blade 25 projects somewhat into the chamber 11 beyond the arc defined by the cylindrical walls 12 of the chamber 11.

A drive means 27, which provides the power to operate the apparatus, drives a feed member 30 in chamber 11. Feed member 30 receives food articles 31 prior to the cutting thereof and carries them into and around the chamber 11 along the cylindrical walls 12 thereof. A screw portion 32 of the feed member 30, with spiral grooves 33 therein, receives the food articles 31 and carries them into the main chamber 11 as the feed member 30 is rotated. Scoop portions 34 on the feed member 30 then pick up the food articles 31 in chamber 11 and rotate them around chamber 11 in contact with the cylindrical chamber walls 12.

As the food articles 31 are rotated about main chamber 11 within scoops 34, they are repeatedly cut into slices by slicer blade 25, as they are brought adjacent passage 20 on each revolution, since blade 25 projects into chamber 11 beyond the arc of the walls 12. Blade 25 is oriented to guide the cut slices through passageway 20, through the discharge or outlet 36 thereof, and thus out of chamber 11.

A comb blade 39 cooperates with slicer blade 25 to guide the food article strips into a series of circular strip blades 40 adjacent discharge 36, so that strip blades 40 may then cut the food article slices into strips. The strip blades 40 are removably mounted on door 15 so that they may be removed when further cutting of the slices into strips is not desired.

A rotatable cutter member 45 is removably mounted on door member 15 opposite the discharge of the food article strips from the strip blades 40. Cutter member 45 has a plurality of peripheral knives 46 attached thereto which cut the food article strips further into cubes. The peripheral knives are generally L-shaped in cross section and the cutting edges of the knives are spaced apart circumferentially at distances several times greater than the thicknesses of the food article slices cut by slicer blade 25.

The wide spacing of the knife 46 cutting edges is for two purposes. First, it enables the cutter member 45 to be rotated at a speed substantially greater than that of the cutter cage disclosed in my U.S. Pat. No. 3,361,171. Secondly, the food article cubes are initially picked up by the knives 46 and rotate momentarily therewith, but due to the wide spacing of knives 46 the food articles are not held therebetween and instead fall very easily therefrom.

The drive means 27 is connected by conventional means to rotate cutter member 45 at a high velocity sufficient to expel the cut cubes therefrom by means of centrifugal forces. The peripheral velocity of the knives, of course, will be a direct function of the spacing therebetween and the velocity of the food slices as they issue from outlet 36, since the knives 46 must cut the cubes from the strips at the precise instant the strips have progressed the length of one cube. The L-shaped cross section enables the proper knife cutting angle to be provided. The proper timed relationship between cutter member 45 and feed member 30, and the proper knife angle, are more fully discussed in my U.S. Pat. No. 3,361,171 (above).

With reference to FIG. 4, the angle (with respect to the vertical) at which the cut food articles are centrifugally expelled from the cutter member 45 is in direct inverse proportion to the mass of the food articles. Thus, perfectly cut food dices are ejected on an almost vertical trajectory while small pieces, scraps, and so on are ejected nearly horizontally.

This invention therefore includes a separation vane 50 which is mounted adjacent the area of discharge of the cut food articles from the rotating cutter member 45. Separation vane 50 is movable relative to member 45 about a pivot 51 so that it may be positioned at an angle between the discharge of the properly cut food articles (falling nearly vertically) and the discharge of the food article scraps (being thrown relatively horizontally). The separation vane thus provides a very direct, inexpensive, and highly efficient means for separating the undesirable food scraps from the properly cut food articles.

In addition to providing a highly efficient apparatus for cutting food articles into dices or cubes, and for separating the cubes from the food article scraps, this invention readily and easily provides food strips (as for french fries) and food slices (as for scalloped potatoes) when desired. To cut the food articles 31 only into strips, cutter member 45 is easily removable, and the strip discharge alone may then be conveniently collected. Alternatively, the strip blades 40 may be removed and the cutter member 45 will then cut the food slices crosswise into strips, enabling vane 50 also to be used to separate the strips from the food scraps. When slices are desired, both the cutter member 45 and the strip blades 40 are removed, resulting in the discharge of slices only. Of course, separate door structures may also be used having the desired blades and/or cutter member mounted thereon, as desired.

Thus, a minimum of components yields all the common cutting patterns. Only one cutter member 45, one slicer blade 25, and one set of strip blades 40 are required in order to obtain any of these common cutting patterns. Further, direct and convenient separation of the food articles from the food scraps is instantly provided by this invention. The need for a separate, expensive, bulky, and sophisticated scrap separator is entirely eliminated.

Additional doors, such as door member 15, having various combinations "pre-set" thereon, may be used for convenience, but are not obligatory. Similarly, separate structures or other means may be used to vary the sizes of the slices, strips and so on. When it is desired to change from one type of cutting pattern to another, the change is made easily, quickly, and conveniently.

As will also be appreciated, it is not necessary to provide a removable door 15. Any one or more of the slicer blade 25, strip blades 40, and/or cutter member 45 could be permanently attached to the housing 10, and the passage 20 then provided through a continuous cylindrical surface or wall means adjacent the slicer blade. Such an embodiment, however, would not be preferred since the removable door facilitates easy cleaning of the apparatus and allows different knife assemblies to be used for cutting to different sizes.

While the forms of apparatus herein described constitute preferred embodiments of this invention, it is to be understood that the invention is not limited to these precese forms of apparatus, and that changes may be made therein without departing from the scope of the invention.

What is claimed is:

1. In an apparatus for cutting food articles such as vegetables and fruits, including a housing having wall means, a passage through the wall means, feed means for receiving food articles and moving them adjacent the passage through the wall means, and slicer blade means adjacent the passage for cutting the food articles into slices as they are moved therepast and directing the cut portions through the passage, the improvement comprising:
   a. strip blade means adjacent the passage for cutting the slices into strips,
   b. means mounting said strip blade means for removal when it is desired to cut the articles into slices,
   c. a rotatable cutter member mounted opposite the discharge of strips from the strip blade means and having peripheral knife means for cutting the strip portions generally into cubes,
   d. means for moving the feed means and the cutter member in timed relationship to cut the strips into cubes,
   e. a port in the wall means,
   f. a door removably attachable over said port and forming a portion of the wall means,
   g. the passage through the wall means being through said door,
   h. The cutter member being attached to said removable door for removal therefrom when it is desired to cut the articles into strips, and
   i. said slicer and strip blade means being attached to said door.

2. In an apparatus for cutting food articles such as vegetables and fruits, including a housing having wall means, a passage through the wall means, feed means for receiving food articles and moving them adjacent the passage through the wall means, and slicer blade means adjacent the passage for cutting the food articles into slices as they are moved therepast and directing the cut portions through the passage, the improvement comprising:
   a. strip blade means adjacent the passage for cutting the slices into strips,
   b. means mounting said strip blade means for removal when it is desired to cut the articles into slices,
   c. a rotatable cutter member mounted opposite the discharge of strips from the strip blade means and having peripheral knife means for cutting the strip portions generally into cubes,
   d. means for moving the feed means and the cutter member in timed relationship to cut the strips into cubes, and
   e. means for separating and discharging the cut food articles in proportion only to their masses at the point of discharge.

3. The apparatus of claim 2 wherein said separation means further comprises a separation vane mounted adjacent the discharge of cut food articles and movable to a position between the discharge of the properly cut food articles and the discharge of food article scraps to separate the scraps from the properly cut food articles.

4. In an apparatus for cutting food articles such as vegetables and fruits, including a housing having a wall means, a port in the wall means, a door removably attachable over the port and forming a portion of the wall means, a passage through the door, feed means for receiving food articles and moving them adjacent the passage through the door, and slicer blade means adjacent the passage for cutting the food articles into slices as they are moved therepast and directing the cut portions through the passage, the improvement comprising:
   a. a strip blade means removably mounted on the door adjacent the passage, for cutting the slices into strips,
   b. a rotatable cutter member removably mounted on the door opposite the discharge of strips from said strip blade means,
   c. a plurality of peripheral knives mounted on said cutter member to cut the strips of food articles into cubes, said knives being generally L-shaped in cross section, with the cutting edges thereof being spaced apart at distances substantially greater than the thicknesses of the food article slices,
   d. means for moving the feed means and said cutter member in timed relationship, said moving means rotating said cutter member at a rotational velocity sufficient to expel the cut food articles from said cutter member by means of centrifugal forces, and
   e. a separation vane mounted adjacent the discharge of the cut food articles from said rotating cutter member and movable relative thereto to a position between the discharge of the properly cut food articles and the discharge of food article scraps, to separate the scraps from the properly cut food articles.

5. In a food cutting apparatus for food articles such as vegetables or fruits, a portion of which cuts and discharges the articles in strips, the improvement comprising:
   a. a rotatable cutter member mounted opposite the discharge of food article strips,
   b. a plurality of peripheral knives mounted on said cutter member to cut the strips of food articles generally into cubes as said cutter member is rotated, said knives being generally L-shaped in cross section and the cutting edges of said knives being spaced apart at distances substantially greater than the thicknesses of the food article strips, said knives being mounted to expel centrifugally the cut food articles during rotation of said cutter member on trajectories which, at the point of expulsion from said cutter member, differ only according to their masses, c. moving means for rotating said cutter member in timed relationship to the discharge of strips from the food cutting apparatus and at a rotational velocity sufficient to expel the cut cubes from said cutter member on trajectories differing according to their masses, and d. a separation vane mounted adjacent the discharge of cut food articles from said rotating cutter member and movable relative thereto to a position between the discharge of the properly cut food articles and the discharge of food article scraps to separate the scraps from the properly cut food articles.

6. A method for separating scraps from properly sized food articles cut from vegetables and fruits in which the vegetables and fruits are fed toward a rotating cutter member, comprising:
a. cutting the food articles with the rotating cutter member,
b. picking up the food articles for rotation with the cutter member,
c. expelling the food articles on trajectories which, at the point of expulsion, differ only according the their masses, and
d. adjusting a separation vane to a position between the discharge of the properly cut and sized food articles and the food article scraps to separate the scraps from the properly cut and sized food articles.

7. In a cutting apparatus for food articles such as vegetables or fruits, a portion of which cuts and discharges the food articles, the improvement comprising:
a. a rotatable cutter member mounted opposite the discharge of food articles,
b. a plurality of peripheral knives mounted on said cutter member to cut the food articles into portions as said cutter member is rotated, said knives being generally L-shaped in cross section and mounted to expel centrifugally the cut food articles during rotation of said cutter member on trajectories which, at the point of expulsion from said cutter member, differ only according to their masses, c. moving means for rotating said cutter member at a velocity to centrifugally expel the portions therefrom on trajectories differing according to their masses, and d. means for separating the expelled food portions according to their trajectories.

8. The apparatus of claim 7 wherein said separating means further comprises a separation vane mounted adjacent the discharge of the food portions from said cutter member.

9. The apparatus of claim 8 wherein said separation vane is movably adjustable.

10. Apparatus for subdividing and size segregating food articles comprising:
a. means for separating the food articles into a series of lengthwise moving portions,
b. a rotatable cutter member located to repeatedly remove the advancing end of said moving food portions and including a rotatable hub, blade means having a first portion tangentially and outwardly directed with respect to said hub and terminating in a sharpened cutting region, and a second portion connecting said first portion with said hub along a path rotationally trailing a radial line extending from the hub axis through the point of hub and blade connection.
c. means for rotating said cutter member to centrifugally expel the food particles subdivided from said food portions by said blade means, and
d. divided receiving means located near said cutter member and including a first opening located a first rotational distance around said cutter member from the end of said food portions for receiving large subdivided food particles and a second opening located a greater rotational distance around said cutter for receiving smaller subdivided food particles.

11. The apparatus of claim 10 wherein said receiving means includes an adjustable divider located between said first and second openings.

12. The apparatus of claim 10 further comprising individually removable slicing and slitting blade means locatable ahead of said rotatable cutter member for dividing said portions prior to said cutter member.

13. The apparatus of claim 10 further including means for synchronizing rotation of said cutter member with movement of said portions.

14. The apparatus of claim 10 wherein said cutter member blade means includes a plurality of blades.

* * * * *